Dec. 9, 1969  E. L. EVANGELISTA ETAL  3,482,891

LOOSE FLANGE ROLLER BEARING WITH CAGE RETAINMENT

Filed June 28, 1968

INVENTORS.
Ernest L. Evangelista &
BY Lubomyr O. Hewko

ATTORNEY

United States Patent Office 3,482,891
Patented Dec. 9, 1969

3,482,891
LOOSE FLANGE ROLLER BEARING WITH CAGE RETAINMENT
Ernest L. Evangelista, Milan, and Lubomyr O. Hewko, Port Clinton, Ohio, assignors to General Motors Corporation, Detroit, Mich., a corporation of Delaware
Filed June 28, 1968, Ser. No. 741,178
Int. Cl. F16c *19/20, 33/46*
U.S. Cl. 308—217                                   6 Claims

ABSTRACT OF THE DISCLOSURE

A unit-handled cylindrical roller bearing assembly in which the rollers are partially nested in a double-shouldered race. The rollers are circumferentially spaced by a separator which retains the rollers in subassembly with the double-shouldered race. The other race is cylindrical and unshouldered. Separate thrust rings are provided for the other race and are held in assembly between the respective end faces of the other race and projections on the separator. The thrust rings are assembled to the cylindrical race by a simple snap action.

---

This invention relates generally to roller bearings and more specifically to a unit-handled cylindrical roller assembly which includes thrust members for the rollers in both directions.

In many bearing applications, it is necessary that the bearing carry both radial loads and bidirectional thrust loads. It is generally recognized that a cylindrical roller bearing carries maximum radial load for a given bearing envelope. In situations where a high radial load capacity within a small bearing envelope is desired along with a bidirectional thrust capacity, it is possible to use roller bearings of two general types. In one type, two double-shouldered races are utilized, however, this bearing is assembled by the Conrad method which limits the number of rollers and, therefore, the radial load capacity. Also the separator must be axially inserted into the bearing and generally is of multipiece construction.

In the other type, one or more separate thrust rings are provided with mounting structure adjacent parts of the bearing ultimately providing the thrust capacity. This second type of bearing is not as limited in radial load capacity. Under normal mass production conditions, it is highly desirable and almost absolutely necessary that the number of separate parts being handled be minimized, and thus, even through one or more thrust rings are separate, they are usually in unit-handled assembly with the bearing. See for example, the U.S. patent to Laycock 1,338,939 in which the separate thrust rings are welded to the races for unit-handling with the thrust capability ultimately being provided by the mounting structure for the roller bearing since the thrust capacity through the welds is not very high. This invention is concerned with the Laycock type of roller bearing, that is, one in which separate thrust rings which ultimately carry thrust through adjacent mounting structure are maintained in unit-handled assembly with the bearing for ease of handling in mass production environment. The object of this invention is generally to improve upon roller bearings of this character and in its broadest aspects contemplates a unit-handled assembly of a cylindrical roller bearing having at least one separate thrust ring in which the thrust ring is held in assembly in a very simple and efficient manner and a method of assembling such a bearing.

Another object of the invention is to provide such an assembly in which only one race requires at least one separate thrust ring.

Another object of the invention is to provide such an assembly which includes a subassembly to maintain the maximum number of parts together should the thrust ring become separated.

Another object of the invention is to provide a unit-handled roller bearing assembly in which a double-shouldered race, rollers, and separator form a subassembly and in which the remaining race and thrust are in assembly and maintained in assembly with the subassembly in a very simple and efficient manner.

Other objects and features of the invention will become apparent to those skilled in the art as the disclosure is made in the following detailed description of a preferred embodiment of the invention as illustrated in the accompanying sheet of drawing in which.

Figure 1:
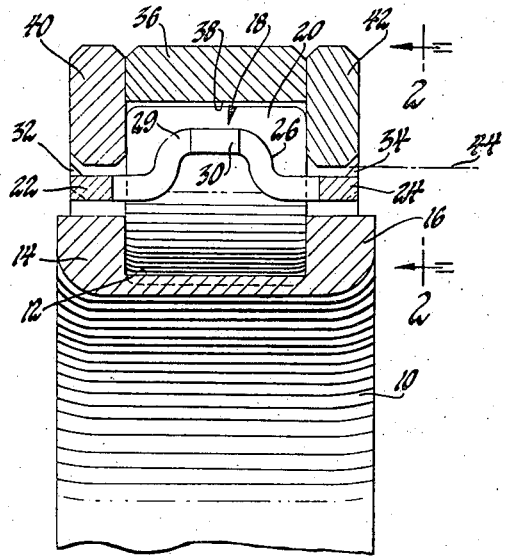
FIGURE 1 is a section taken through the axis of a unit-handled cylindrical roller bearing in accordance with this invention.

Referring now to the drawings and more particularly to FIGURE 1, the unit-handled cylindrical roller bearing assembly includes an inner race 10 of the double-flanged type, that is, it includes a pathway 12 lying between integral thrust shoulders 14 and 16, respectively. Separator 18 circumferentially spaces a number of rollers 20. The rollers 20 rollably engage the pathway 12 and are partially nested in the inner race 10, that is, they are disposed in the annular groove defined by a pathway 12 and the integral thrust shoulders 14 and 16.

Figure 2:
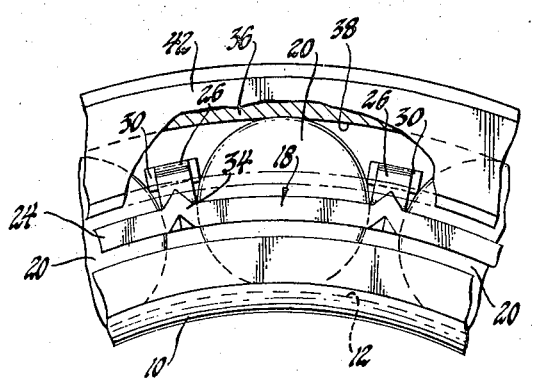
FIGURE 2 is a view taken along the line 2—2 of FIGURE 1 and looking in the direction of the arrows.
Figure 3:
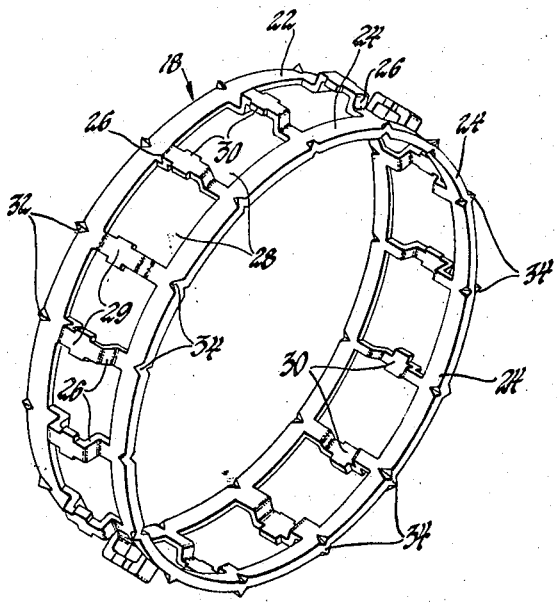
FIGURE 3 is a perspective view of the separator of FIGURES 1 and 2.

Referring now to FIGURE 3, the separator 18 is shown as a one-piece sheet metal structure although equivalent materials are contemplated. The separator 18 includes end rings 22 and 24 connected by integral cross bars 26 forming windows or pockets 28 for the rollers 20. Each cross bar 26 includes a raised central portion 29 widened in the circumferential direction at its center 30. The distance between the facing edges on two adjacent widened centers 30 is less than the diameter of a roller, such as 20, so that the roller is retained against the pathway 12 of the inner race 10. See FIGURE 2. Thus, the inner race 10, rollers 20, and separator 18 form a subassembly.

From FIGURE 3, it will be observed that the end rings 22 and 24 have been mechanically operated upon so that each of the end rings include a set of circumferentially spaced projections 32 and 34, respectively.

Returning to FIGURE 1, the outer race 36 is merely a straight cylinder with its inner circumferential surface 38 providing the second pathway for the rollers 20. Separate thrust rings 40 and 42 abut the end faces of the outer race 36, respectively. The manner in which each thrust ring is held in assembly is the same so that only the relationship between the thrust ring 42 and the separator 18 will be described. The inner annular surface of thrust ring 42 lies in a cylindrical plane 44. The projections 34 on the separator intersect this imaginary surface 44 so that the thrust ring 42 is trapped between the projections 34 and other parts of the bearing. For instance, the thrust ring 42 is limited in axial movement to the left by either the right end face of the outer race 36 or the right end faces of the rollers 20. The projections 34 limit the axial movement of the thrust ring 42 to the right. The number and location of the projections 34 will vary with the size of the bearing and other design parameters, however, the number and location of the projections and the separator material should be chosen so that the separator is sufficiently resilient to elastically deform and allow the thrust ring 42 to pass over the projections 34 without any permanent deformation or distortion to the separator 18. It is also preferable that the retainer 18 be sufficiently resilient so that the rollers 20 can be snapped into the separator windows from the radially outward direction in order to facilitate the subassembly of rollers, retainer, and inner race; this subassembly being desirable should one of the thrust rings accidentally become separated from the assembly.

Briefly, the bearing is assembled as follows. The separator 18 and inner race 10 are substantially concentrically located with respect to each other and the rollers are snapped into the retainer windows 28 from the retainer outer diameter direction. This subassembly is then nested in the outer race 36 and the separate thrust rings 40 and 42 are either separately or simultaneously added to the assembly. The thrust rings are added to the assembly by concentrically locating them with respect to the other members and then forcing the thrust ring over the projections in the axial direction. Thus it can be seen that a unit handled assembly of a cylindrical roller bearing which includes separate thrust rings for maximum radial load capacity which includes a subassembly for maximum mass production convenience should the thrust rings become accidentally separated which maintains the thrust rings in assembly in a very simple manner through projections on the separator and in which the thrust rings are easily assembled by a snap-over action has been provided.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. A unit-handled cylindrical roller bearing assembly comprising,
   an inner race having circumferential shoulders defining a first pathway therebetween,
   a plurality of rollers rollably engaging said first pathway,
   a unitary separator having end rings and cross bars defining windows, said windows surrounding and circumferentially spacing said rollers,
   an outer substantially cylindrical race having a second pathway on its inner circumferential surface, said second pathway engaging said rollers,
   an annular thrust ring abutting each end face of said outer race and lying adjacent each end face of said rollers,
   each of said end rings of said separator having a set of circumferentially spaced projections operatively associated with said thrust rings, respectively,
   each set of said projections intersecting an imaginary cylindrical surface containing the inner circumferential surface of the thrust ring with which it is operatively associated, said end rings being resilient whereby said thrust rings may be snapped past said projections to provide a unit-handled assembly of races, rollers, retainer, and thrust rings.

2. The unit-handled cylindrical roller bearing assembly as defined in claim 1 wherein said retainer includes means to limit the outward displacement of said rollers from said inner race whereby said unit-handled roller bearing assembly includes a unit-handled subassembly of inner race, rollers, and separator.

3. A unit-handled cylindrical roller bearing assembly comprising,
   first race means including a first pathway bordered by integral circumferential shoulders,
   a plurality of rollers rollably engaging said first pathway,
   a one-piece separator having end rings and cross bars defining windows circumferentially spacing said rollers,
   second race means including a second pathway bordered by a pair of thrust rings, at least one of said thrust rings being separable from said second pathway,
   said second race means being axially aligned with said separator whereby said thrust rings are aligned with said end rings, respectively,
   a set of circumferentially spaced projections on each end ring, each of said sets intersecting an imaginary cylindrical surface containing the inner circumferential surface of the thrust ring with which it is aligned whereby a unit-handled assembly of a thrust ring, race means, separator and rollers is provided.

4. The unit-handled cylindrical roller bearing assembly as defined in claim 1 wherein said separator includes means to limit the radial displacement of said rollers away from said first pathway whereby said unit-handled roller bearing assembly includes a unit-handled subassembly of said first race means, rollers, and separator.

5. In a unit-handled cylindrical roller bearing assembly having one double-shouldered race and a plurality of rollers circumferentially spaced by a separator, the improvement comprising,
   said separator being a one-piece, resilient member having continuous end rings integrally connected by cross bars which together with the end rings form windows, each of which completely surround a roller,
   a substantially cylindrical second race and
   a pair of separate annular thrust rings, each of said thrust rings being held in assembly by an end face on the second race which limits axial movement in a first direction and by abutment portions on the end rings in an opposite direction, the separator being sufficiently resilient to elastically deform so that the abutment portions on the end rings are placed in an operative condition by a simple snap-over action.

6. A method of assembling a unit-handled cylindrical roller bearing comprising the steps of:
   concentrically, axially aligning a plurality of rollers which are circumferentialy spaced by a separator and are partially nested in a double-shouldered race with a substantially cylindrical unshouldered second race,
   forcing a first thrust ring in a first direction against retaining portions on a first side of the separator to elastically deform the separator to an extent which allows the thrust ring to pass the retaining portions and abut an end face on the second race, and
   forcing a second thrust ring in the opposite direction against retaining on the opposite side of the separator to an extent which allows the second thrust ring to pass the retaining portion and abut the opposite end face on the second race.

References Cited

UNITED STATES PATENTS 1,422,162   7/1922   Zahn _____ 308—212

MARTIN P. SCHWADRON, Primary Examiner

FRANK SUSKO, Assistant Examiner